Figure 1:
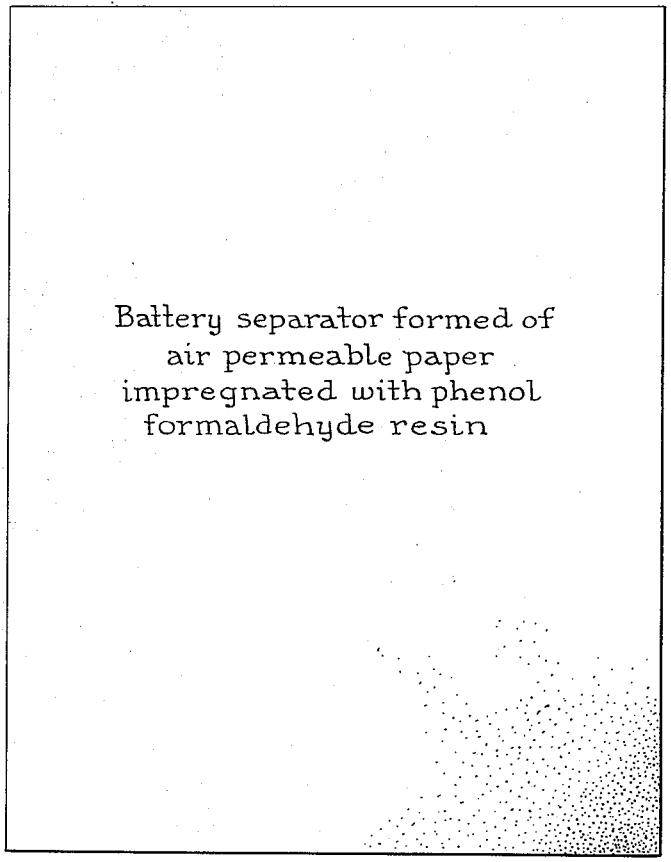

Feb. 27, 1951     J. J. UBER     2,543,137

BATTERY SEPARATOR

Filed April 12, 1946

Battery separator formed of air permeable paper impregnated with phenol formaldehyde resin Inventor
Jay J. Uber
Attorney Patented Feb. 27, 1951

2,543,137

UNITED STATES PATENT OFFICE 2,543,137

BATTERY SEPARATOR

Jay J. Uber, Westfield, Mass., assignor, by mesne assignments, to Texon, Inc., Russell, Mass., a corporation of Massachusetts Application April 12, 1946, Serial No. 661,896

11 Claims. (Cl. 136—145)

This invention has to do, in general, with improvements in lead-acid storage batteries and, specifically, with improvements in the so-called "separators" which, in the construction of lead-acid cells, are placed between the positive and the negative plates.

When a lead-acid storage battery is charged, the active material which is deposited on the positive plate unfortunately does not form a smooth, level surface, but it builds up as excrescences or so-called "trees." These "trees" project toward the negative plate, and if the two are close together a short-circuit will ensue.

Since the internal resistance of a battery is influenced by the distance between the plates, and since the size of the battery should be kept as small as possible, it has been customary to insert some sort of a "separator" between the plates to prevent this short-circuiting and to inhibit, as far as possible, the dislodgment of the positive active material.

Because wood is an inexpensive material, many attempts have been made to produce efficient "separators" from various woods. It has been found, however, that wood as such cannot be used. The lignin, which all wood contains, is readily oxidized to acetic acid which attacks lead and destroys the battery; various minerals, such as chlorides, manganese salts, etc., which are present in woody tissue, have a deleterious action on the battery's performance; and the resins, gums and waxes plug the interstices of the wood and lower its porosity. It has, therefore, been found necessary to treat any wood for use as a "separator" by extracting as much as possible of the non-cellulosic materials.

With extracted wood "separators," it appears that the greater the porosity, the shorter the life; with "separators" in general, the greater the porosity, the higher the efficiency. This latter is because the separators must be ionically permeable so that ionic flow may be maintained through the electrolyte and the separators; anything which impedes ionic flow causes an increase in the internal resistance of the cell; consequently, the I²R losses are increased and the watt-hour efficiency is decreased.

Insofar as these I²R losses and watt-hour efficiency are concerned, extracted wood "separators" made from naturally porous woods are highly efficient. A cell containing porous wood "separators," for example, requires a lower charging voltage and delivers a higher discharge voltage than does one equipped with perforated rubber "separators."

However, porous, extracted wood "separators" fail early by carbonization, probably due to the oxygen given off by the active material of the positive plate, so that many atttempts have been made to coat the individual fibers of the extracted wood so as to prolong its life. Such treatment, however, decreases the porosity because it is impossible to prevent some of the rubber film from bridging over and closing some of the pores; it has also been found that sufficient oxygen penetrates the film of rubber to cause carbonization in a relatively short time.

Another objection to wood "separators" is their lack of uniformity. Wood, even from the same tree, varies in porosity, depending upon whether it is cut from near the heart or from near the surface and whether it is "quarter sawed" or "straight sawed."

An additional difficulty with wood "separators" is that after the non-cellulosic materials are extracted, the "separators" must not be allowed to dry out. They must be shipped and stored in a wet condition. If they are allowed to dry, they warp and curl and become entirely unfitted for "separator" use.

It is extremely desirable that charged lead-acid batteries be stored after manufacture and shipped from place to place in the "dry" condition (i. e., without any battery acid), the acid being added only when the battery is to be put to use.

Since wood "separators" must not be allowed to become dry, it is evident that wood "separators" cannot be employed in batteries which are to be stored or shipped in a "dry" condition.

This invention therefore has as its chief object the production of "separators" for lead-acid storage batteries which will have long life, which will be uniform, which will be porous enough to keep the I²R losses as low as possible, and which will completely resist penetration by "trees," or excrescences, of active positive material. Another object is to produce efficient "separators" from a cellulosic substance. A further object is to produce an efficient "separator" from paper.

An additional object is to produce a "separator" which can be shipped and stored in a "dry" condition, and which when assembled into a battery will permit the storage and shipment of the battery in a "dry" condition.

Other objects will become apparent as the description of the invention proceeds.

Figure 2:

In the accompanying drawing Fig. 1 is a face view of a battery separator embodying the invention, and Fig. 2 is an edge view of said separator.

In accomplishing the foregoing objects, I began with a paper base preferably a high alpha-cellulose content paper, for example a 93% alpha-cellulose content paper. This paper is so constructed that its thickness varies between the limits of .028 inch and .040 inch, with the preferred thickness being about .032 inch. The paper should preferably have a porosity (air permeability) between about 4 and 28 seconds as determined by the Gurley densometer as described more fully hereinafter.

The paper having the above properties is then immersed until it is completely saturated in a solution of an "A" stage phenol-formaldehyde resin in water. This immersion is carried out at ordinary room temperature. The time of immersion varies from 12 seconds to 30 seconds, and the excess solution is removed with a squeeze-roll.

The phenol-formaldehyde resin should be of such a character that it is dilutable with water without separation when 1 part of resin is diluted with 9 or more parts of water, and I prefer that the saturating solution contain from 25% to 50% of the resin, preferably about 35%. I have found that a resin designated as "Resinox #468," made by Monsanto Chemical Company, is suitable for this impregnation. Any phenol whether substituted or not may be used with formaldehyde to prepare the impregnant provided the A stage reaction product is dilutable in water within the above limits and further provided that the C stage resin is not adversely affected by battery acid. The exact concentration should be such that the paper, after immersion, squeezing and subsequent evaporation of the water will have its weight increased from 33% to 100%, preferably about 54%. A method by which such resins may be produced is disclosed in the Handbook of Plastics by Simonds & Ellis, First Edition, first published in July 1943 by D. Van Nostrand Company, Inc. at pages 476 to 478, up to the point captioned "Vacuum dehydration." If desired this resin may be subjected to some vacuum dehydration, but not to such an extent that the condensation reaction will continue until a too advanced resin is formed. The reaction must be arrested while the resin is still dilutable to the extent of at least 9 parts water to one part resin. For example, the procedure described in the patent to Meharg, No. 2,190,672, granted February 20, 1940, at page 3, column 1, lines 52 to 75, may be followed.

The saturated paper is then dried for from 5 to 10 minutes at a temperature below the polymerizing point of the phenolformaldehyde resin, i. e., from 112° C. to 136° C. After this drying, the impregnated paper is formed into the proper shape and size for battery "separators" and these "separators" are then heated for 2 minutes at 170° C. to cure the phenol-formaldehyde resin to the "C," or insoluble-infusible stage.

The finished "separator" should have a thickness varying from about .028 inch to .040 inch, and it should have a "porosity" (air permeability) varying from 4 seconds to 28 seconds as determined with a Gurley densometer using the special 5-ounce weight inner cylinder. (T. A. P. P. I., Tentative Standard Method for Air-Permeability of Paper, T-460-M-43; also, A. S. T. M., Tentative Method, D-726-43T.) The figures, 4 seconds and 28 seconds, are the respective times required for the passage of 100 ccs. of air through 1 square inch of "separator" under the conditions of the test.

"Separators" made by the process of this invention, possessing the desired characteristics of thickness, porosity (air permeability) and resin content outlined above, will exhibit an electrical resistance, in battery-acid, when thoroughly wetted with the acid varying from .043 ohm to .104 ohm per square inch. If the porosity (air permeability) is too great (below 4 seconds), the "separator" will be too fragile and will be so porous that the "trees" of active positive material will penetrate it and short-circuit the cell. If the "porosity" (air permeability) is too low (i. e., more than 28 seconds), the passage of the electric current will be impeded and the ohms per square inch will be too high. This will increase the internal resistance of the cell and the $I^2R$ losses will be too great.

My invention may also be conveniently carried out on a semi-continuous process in which the paper having the desired characteristics is passed directly from the paper-making machine through the bath of impregnating resin, and then after passing a squeeze-roll it is dried for from 5 to 10 minutes on conventional steam-heated revolving steel drums at a temperature between 112° C. and 136° C. After this drying, the impregnated paper is cut and formed into the proper shape and size for battery "separators" and is heated for 2 minutes at 170° C. to insolubilize the resin.

The "separators" of my invention have the following advantages over other types of "separators."

They cost from one-half to one-third as much as spun glass mat or rubber "separators."

They prevent completely the penetration of "trees" of active positive material which spun glass mats do not always succeed in doing.

They are much less fragile than the so-called microporous rubber "separators" which are extensively used.

They are suitable for employment in the fabrication of batteries which are to be shipped and stored in the "dry" condition, and thus are superior to extracted wood "separators" which must not be allowed to dry out.

They have a durability, or life, which compares favorably with a spun glass mat or a rubber "separator," and they are much more durable and uniform than an extracted wood "separator."

It is apparent that many widely different embodiments of this invention may be made without departing from the spirit and scope thereof, and therefore, it is not intended to be limited except as indicated in the appended claims.

I claim:

1. A liquid permeable battery separator comprising a paper base sheet having an air permeability between about 4 and 28 seconds as determined with a Gurley densometer, said sheet being thoroughly impregnated with a C-stage phenol-formaldehyde resin, said resin being such that while in the A-stage it is dilutable with at least 9 parts of water for each part of resin without precipitation of the said resin, the resin being so distributed over the interior and exterior surfaces of the fibers of the paper as to protect the same against attack by the battery liquid but not to materially lessen the air permeability of the original base sheet.

2. The product of claim 1 in which the paper base has a thickness of about .028 to .040 inch.

3. The product of claim 1 in which the thickness of the paper is .032 inch.

4. The product of claim 1 in which the paper is impregnated with from 33 to 100% by weight thereof of the resin.

5. The product of claim 1 in which the paper is impregnated with about 54% of resin based on the weight of the paper.

6. The process of preparing liquid permeable battery separators which comprises completely saturating a paper base having an air permeability between 4 and 28 as determined by a Gurley densometer with a 25 to 50% aqueous solution of a phenol-formaldehyde resin in the A-stage, said A-stage resin being dilutable with at least 9 parts of water for each part of resin without precipitation of the resin, evaporating the water by drying for about five to ten minutes at a temperature between about 112° C. and 136° C. and leaving a layer of the resin distributed over the interior and exterior surfaces of the fibers of the paper to protect the same against attack by the battery liquid without materially lessening the air permeability of the original paper base, and thereafter polymerizing the resin by heating the same at about 170° C.

7. The process of claim 6 in which the paper has a thickness of about .028 to .040 inch.

8. The process of claim 6 in which the thickness of the paper is .032 inch.

9. The process of claim 6 in which the paper is impregnated with from 33% to 100% by weight thereof of the resin.

10. The process of claim 6 in which the paper is impregnated with about 54% of resin based on the weight of the paper.

11. The process of preparing liquid permeable battery separators which comprises immersing a paper base having a thickness of about .032 inch and an air permeability between about 4 and 28 seconds as determined with a Gurley densometer in a 25 to 50% aqueous solution of a phenol-formaldehyde resin in the A-stage, said A-stage resin being dilutable with at least 9 parts of water for each part of resin without precipitation of the resin, allowing the paper to be immersed for from 12 to 30 seconds, squeezing the impregnated paper to remove the excess solution while leaving a layer of the resin distributed over the interior and exterior surfaces of the fibers of the paper to protect the same against attack by the battery liquid without materially lessening the air permeability of the original paper base, drying the impregnated paper for from 5 to 10 minutes at a temperature between about 112° C. and 136° C. and thereafter curing the same by heating at about 170° C.

JAY J. UBER.

REFERENCES CITED

The following references are of record in the file of this patent:

UNITED STATES PATENTS

| Number | Name | Date |
| --- | --- | --- |
| 1,173,907 | Williamson | Feb. 29, 1916 |
| 1,206,983 | Bliss | Dec. 5, 1916 |
| 1,366,223 | Wales | Jan. 18, 1921 |
| 1,888,771 | Richter et al. | Nov. 22, 1932 |
| 2,041,485 | Reiss | May 19, 1936 |
| 2,054,444 | Pinten | Sept. 15, 1936 |
| 2,150,698 | Nevin | Mar. 14, 1939 |
| 2,185,477 | Thompson et al. | Jan. 2, 1940 |
| 2,190,672 | Meharg | Feb. 20, 1940 |
| 2,292,118 | Guhl | Aug. 4, 1942 |
| 2,362,274 | Hurst | Nov. 7, 1944 |
| 2,383,283 | Auxier | Aug. 21, 1945 |
| 2,388,184 | Ripper | Oct. 30, 1945 |
| 2,397,453 | White | Mar. 26, 1946 |

OTHER REFERENCES

Vinal, G. W., Storage Batteries, 3d Edition (1940), page 52.

Larson, Product Engineering, September 1944, page 605 relied on.